Figure 1:
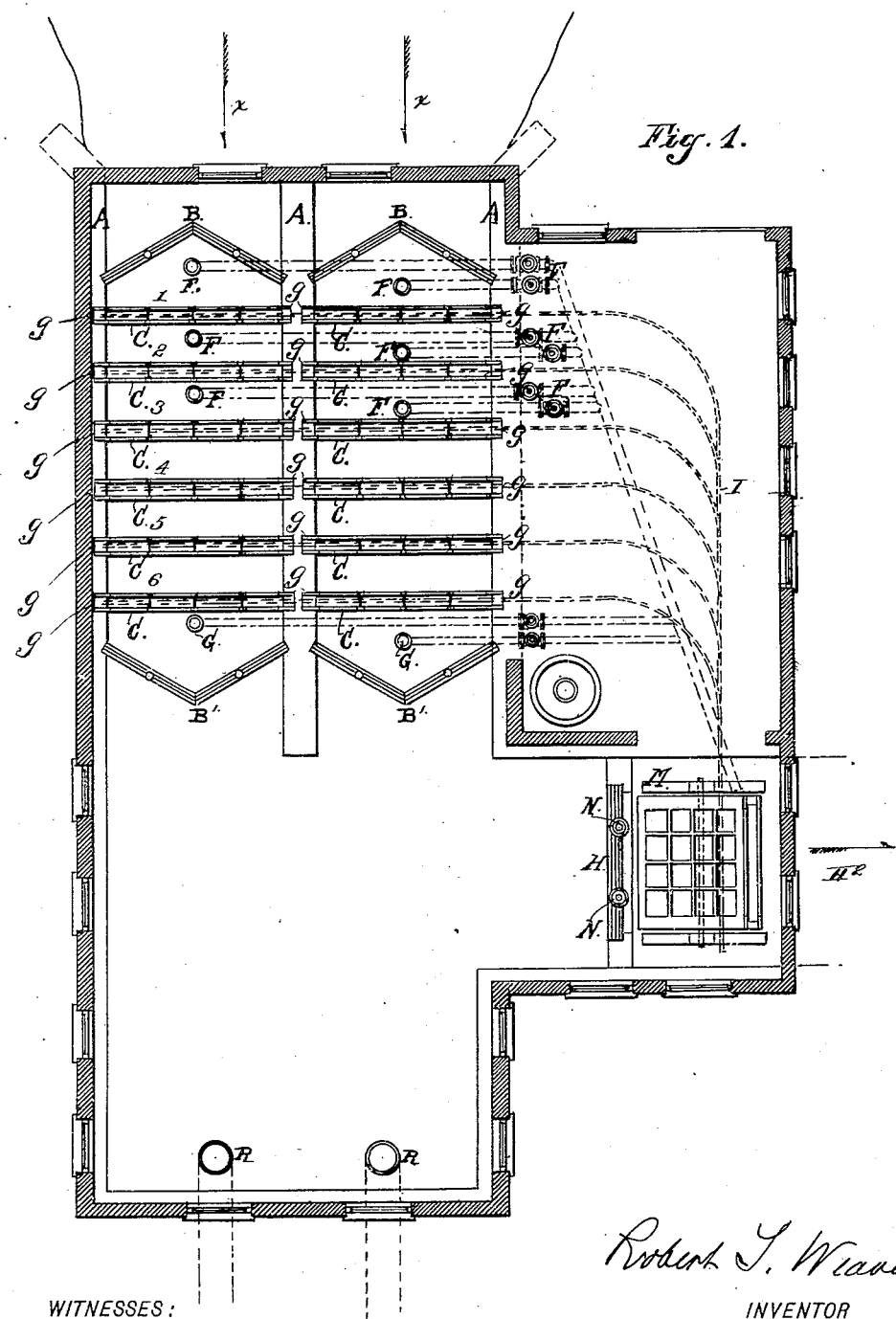

No. 653,759. Patented July 17, 1900.
R. T. WEAVER.
GRANULAR BED FILTER.
(Application filed Mar. 9, 1900.)
(No Model.) 5 Sheets—Sheet 1.

WITNESSES:

INVENTOR
Robert T. Weaver

BY
ATTORNEY

No. 653,759. Patented July 17, 1900.
R. T. WEAVER.
GRANULAR BED FILTER.
(Application filed Mar. 9, 1900.)
(No Model.) 5 Sheets—Sheet 2.

WITNESSES:

Robert T. Weaver
INVENTOR

BY
ATTORNEY

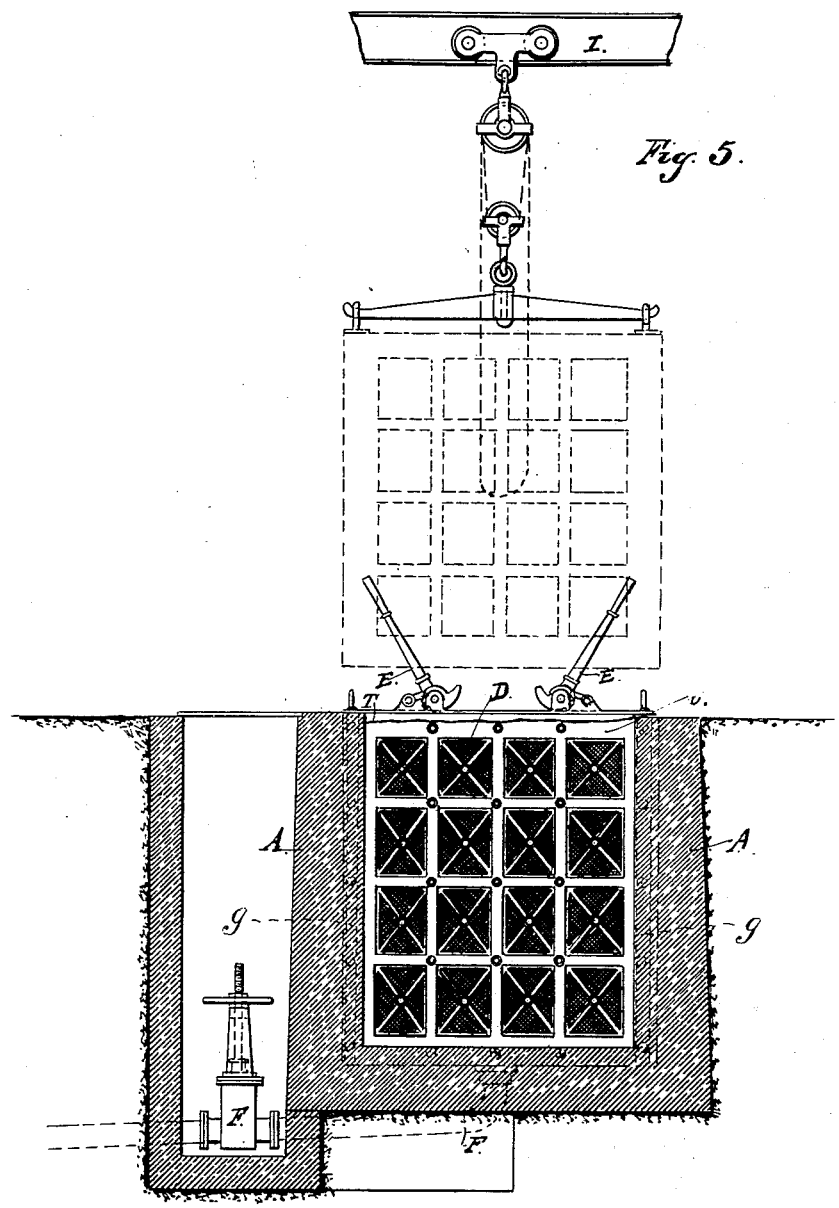

No. 653,759. Patented July 17, 1900.
R. T. WEAVER.
GRANULAR BED FILTER.
(Application filed Mar. 9, 1900.)
(No Model.) 5 Sheets—Sheet 4.
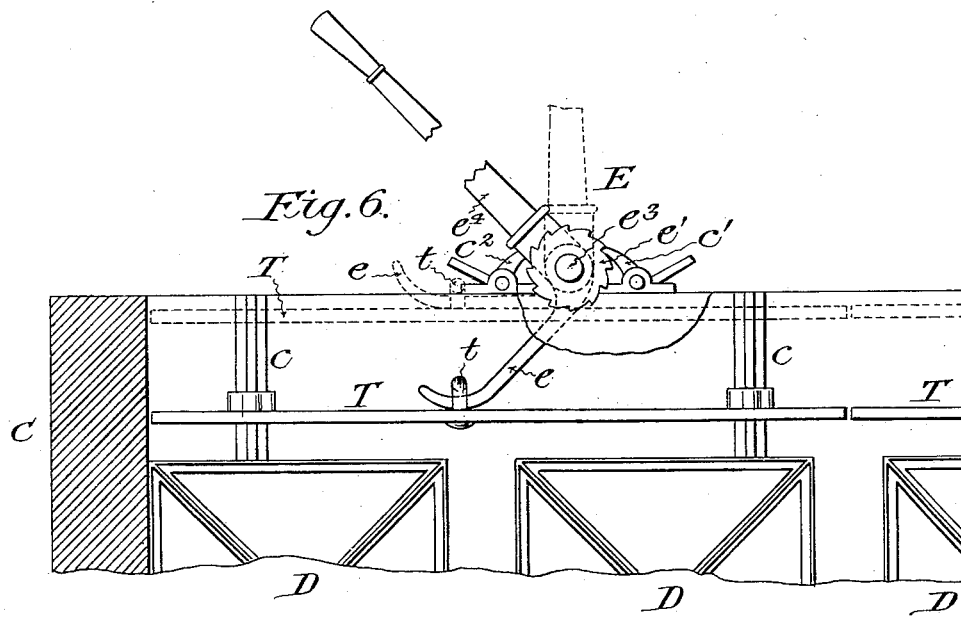
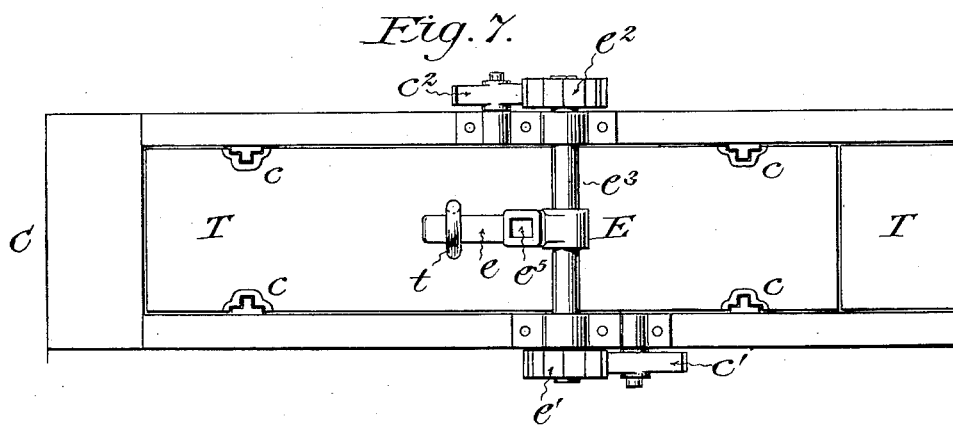
Robert T. Weaver
Inventor
Witnesses

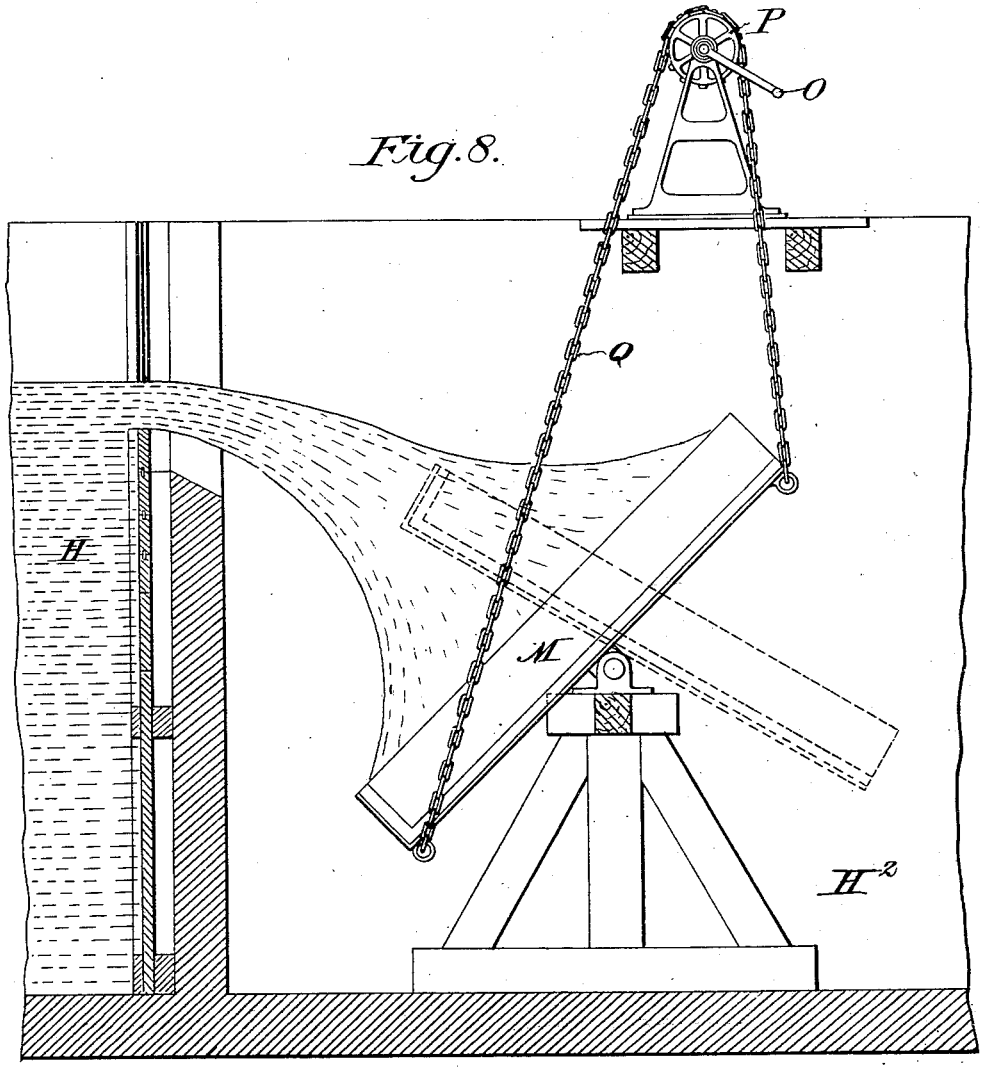

UNITED STATES PATENT OFFICE.

ROBERT T. WEAVER, OF NEW YORK, N. Y.

GRANULAR-BED FILTER.

SPECIFICATION forming part of Letters Patent No. 653,759, dated July 17, 1900.

Application filed March 9, 1900. Serial No. 8,064. (No model.)

*To all whom it may concern:*

Be it known that I, ROBERT T. WEAVER, a citizen of the United States, and a resident of the city of New York, in the county of New York and State of New York, have invented certain new and useful Improvements in Granular-Bed Filters, of which the following is a specification.

In filter plants of large capacity such as are required for towns and cities the filtering device now in use usually consists of several horizontal beds made up of quartz gravel, sands, &c., in layers. The water to be filtered is distributed over these beds, through which it percolates and is collected as filtered water by appropriate devices arranged underneath the beds. This method of water purification is open to three very serious disadvantages. The area of land required for the installation of such a plant is considerable, a plant of the capacity of forty-one millions of gallons in twenty-four hours requiring about eight acres of land, while any increase in capacity requires a proportionate increase in area. Again, the housing in of an area so extensive where the severity of the climate in winter renders protection against freezing necessary is a very serious item of initial expense and expense of maintenance. Furthermore, the cleaning of the filter-beds, which is frequently necessary, requires the withdrawal from use of the beds to be cleaned for quite a time, to say nothing of the labor and expense of turning over, washing, and replacing the filtering material. My invention is designed to meet and overcome these objections.

It consists, generally speaking, of a filtering-basin not unlike a lock of a canal through which the water flows in process of filtering. At intervals in this basin and in planes at right angles to its length are placed the filters in series, each filter being filled with material of uniform character, the coarser in the filter near the inlet and the finer nearer the discharge.

In my practical experience in the construction and operation of filter plants I have discovered that the filtering power of a given filtering material is practically exhausted at or very near its surface—that is, that a stratum of sand, for example, of a few inches is practically as efficient a filter as one of almost as many feet in thickness. If this be true, it is obvious that the ordinary practice of making up a filter-bed of various strata of various finenesses of filtering material superimposed one upon the other is faulty, since the impurities strained from the water are collected at the surface of each change of material. Consequently these impurities are largely imprisoned within the body of the filter-bed, making proper cleansing so laborious and difficult as to be practically almost impossible. Thus the filtering capacity of the filter-bed soon diminishes considerably and is never restored to its pristine efficiency until it is entirely made over. To utilize this discovery in a practical way is one of the main objects of my invention.

Figure 2:
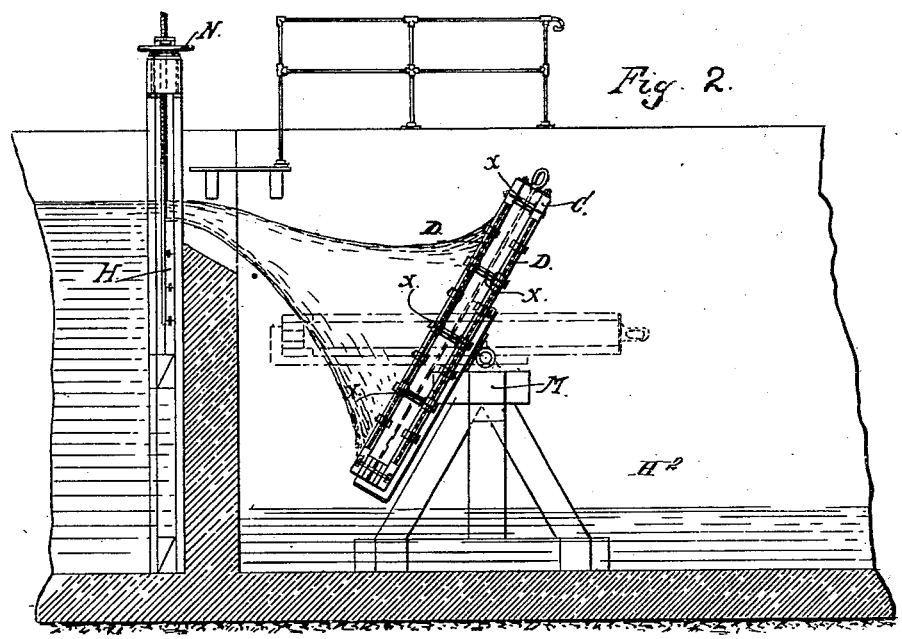
Figure 3:
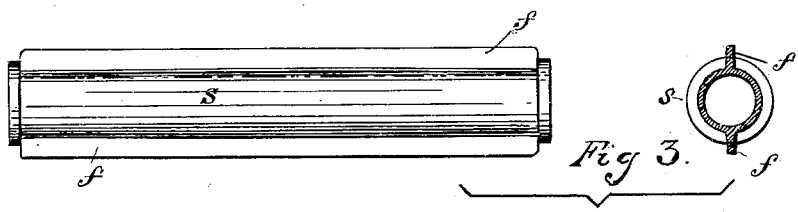
Figure 4:
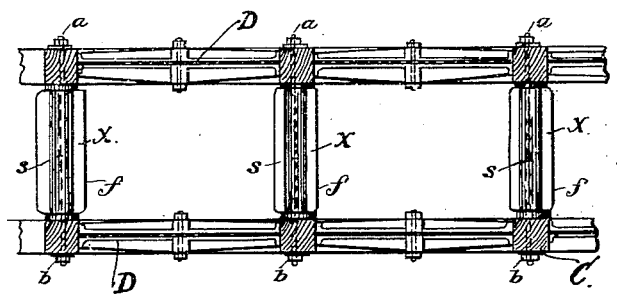

In the drawings forming part of this specification, Figure 1 represents a plan view of a filter plant of two batteries of filters constructed according to my system. Fig. 2 represents an elevation, partly in section, of my washing device. Fig. 3 represents a longitudinal view and cross-section of a detail in construction of my filters—viz., the stay-bolts connecting the walls of said filters. Fig. 4 represents a sectional view of one of my filtering devices. Fig. 5 represents a cross-sectional view of my filtering-basin, showing one of my filters in position and by dotted lines another hoisted up and ready for removal to the washing-house or a clean filter in position to be substituted for a duplicate filter which has been removed to be cleaned. Fig. 6 represents a fragmentary sectional elevation of one of the filters, showing the details of its movable cover and cam-levers hereinafter referred to. Fig. 7 represents a top view projected from Fig. 6.

A represents the filter-basin, which may be of timber or other suitable material incased in masonry, if so desired.

B and B' represent two-leaved hinged gates, meeting in their middle, one pair, B, at the intake of the unfiltered water and one pair, B', at the outlet of the filtered water. The arrows in Fig. 1 show the direction of the flow.

C C C represent the filters. These are arranged in series in the filter-basin in the form of porous walls, with intervals between them, as shown in Fig. 1. These filters are each made up of two frames divided up into compartments, very much like a window-sash, as shown in Fig. 5. These frames are spaced about eighteen inches apart and parallel with one another, as shown in Fig. 4, and are held together by proper sides and bottoms and the "stay-bolts," X, as is also shown in that figure. Each of these stay-bolts comprises an ordinary metal rod $a$, provided with nuts and washers $b$, passing from side to side through both frames; but between the frames each rod is covered with the sleeve $s$, (shown by itself in Fig. 3,) which serves not only to keep the frames the proper distance apart, but also to break up the filtering material in the process of washing, for which purpose the several sleeves $s$ are provided with the fins $f$. (Best shown in the cross-sectional view in Fig. 3.)

The compartments in the filter-frames are covered by properly-supported screens, as shown at D, Figs. 4, 5, and 6. Thus my completed filter-frames in a general way resemble two similar window-frames so united as to be spaced about eighteen inches apart and provided with screens instead of panes of glass. The space between the said frames is filled with the filtering material, over which is placed a movable cover T, and this cover is forced down by the cam-levers E, Figs. 5, 6, and 7, or any similar device for applying pressure to make and keep the filtering material as compact as possible. The details of the cover T and one of the cam-levers E of a filter C are represented in Figs. 6 and 7. The cover is preferably made in sections, one to each lever, and guided by ways $c$, attached internally to the sides of the filter. A stirrup $t$ on each section of the cover receives the cam $e$ of the coacting lever. Ratchet-wheels and dogs $e'$ $c'$ and $e^2$ $c^2$ serve, respectively, to progressively secure the lever E in its respective functions as it presses the cover T down upon the granular filtering material and as it elevates the cover to loosen the material, the ratchet-wheels $e'$ and $e^3$ being conveniently fast on the respective extremities of the pivot $e^3$ of the lever and the dogs $c'$ and $c^2$ pivoted to bearings for said pivot fast on the upper edges of the filter sides, as best shown in Fig. 7, and the handle $e^4$ of the lever is removable from a socket $e^5$, Fig. 7, as represented in this figure.

The filters C C C are set into the filtering-basin in vertical grooves $g$, as shown in Fig. 1, the joints being made water-tight by packing or in any other suitable manner, so that no water can pass from one filter to another except through the preceding filter of the series. They are spaced at intervals, as shown, each filter containing filtering material substantially of the same character and fineness throughout. As to the number of filters, I prefer a battery of six filters in each basin, as shown in Fig. 1, arranged as follows: Calling the filter nearest the intake (indicated by the arrows $x$ in Fig. 1) of the unfiltered water No. 1 and numbering them consecutively to the other end of the basin, filter No. 1 contains the coarsest, No. 2 the intermediate, and No. 3 the finest, filtering material. Upon these three filters I mainly rely for straining the water. Filters Nos. 4, 5, and 6 I usually fill with animal charcoal, the finest in No. 4, the intermediate in No. 5, and the coarsest in No. 6, and on these three filters I rely for purifying the water in addition to their straining effect and that of the prior filters. A battery of my filters so constructed twenty-five feet long nine feet wide and eleven feet deep, with an eleven-inch head of water, will filter about forty-one million gallons of water of the average character in twenty-four hours, and thus equals in capacity a plant of horizontal filtering-beds covering approximately eight acres of ground. The plant of two batteries, as shown in Fig. 1, has of course double that capacity, and it is apparent how greatly the capacity of the plant may be increased by increasing the number of the batteries and how little, comparatively, the superficial area of the plant is increased thereby. The great saving of expense in housing my system over that employing the horizontal filter-beds in ordinary use is also obvious.

As is well known to all skilled in this art, the character of the filtering material it is best to use depends upon the character of the water to be filtered, the object being to do the work at the least expense in plant, &c., consistent with efficiency. The number of filters to the battery and the character of the filtering material used may be varied widely, according to circumstances or the views of the contracting engineer in these respects, without departing from my invention. For water of average degree of impurity I prefer a battery of six filters, as shown, filling No. 1 filter with crushed slag in particles about the size of a pea, No. 2 filter with flint crushed to about the size of granulated sugar, No. 3 filter with fine silicious sand, and the other filters, Nos. 4, 5, and 6, with animal charcoal, as already set forth.

F F, Figs. 1 and 5, represent drain-pipes set in the floor of the filtering-basin, so that by closing the influent-gates B and the effluent-gates B' the filter-basin may be drained and the filtering-surfaces be scoured and washed in position if that method of cleaning be desired.

G G, Fig. 1, represent pipes and valves for draining the filter-basin from leakage from the effluent-gates B' when it is desired to empty the filtering-basin.

H, Figs. 1, 2, and 8, is a flood-gate, and $H^2$ is a sluiceway leading therefrom for cleansing the filters after removal from the filter-basin.

I, Figs. 1 and 5, is an overhead trolley with chain-block to remove the filters from the filter-basin, transport them to the washing-house, and replace them after cleaning.

N N, Figs. 1 and 2, are hand-wheels for opening and closing the washing flood-gate H.

M, Figs. 1, 2, and 8, is a cradle upon which to place and rock or shake a filter for agitating its contents while washing.

O, Fig. 8, is a hand-crank, P a sprocket-wheel turned back and forth at will by said hand-crank, and Q a chain transmitting motion from said crank and sprocket-wheel to the cradle M.

R R, Fig. 1, represent intakes for the filtered-water pumps.

My system operates as follows: The inlet-gates B and the outlet-gates B' are opened. The unfiltered water enters as indicated by the arrows, (see Fig. 1,) encounters filter No. 1, which intercepts such suspended matter as it is competent to deal with, passes through it to filter No. 2, which acts in a similar manner, and so on through the series of filters and passes out through the outlet-gates B' as filtered water.

When one or more of the filters require cleaning, the gates B and B' may be closed, the filter-basin drained through the drainage-pipes F and G, and the filters scrubbed and washed in position. This will answer where initial cheapness of construction is important; but it has the disadvantage of withdrawing the entire battery from use for a considerable time and of being dependent on manual labor and the skill and thoroughness of the laborer. My system avoids these disadvantages to a great extent.

When a filter it to be cleaned, it is hoisted out of the filter-basin, as shown in Fig. 5, and run on an overhead trolley or otherwise to the washing-house. A duplicate clean filter is at once substituted in the filter-basin, which thereupon is again ready for use. Such cleaning is done more or less frequently as the working of the battery may indicate.

When the filter to be cleaned reaches the washing-house, the levers E, Figs. 5, 6, and 7, are thrown over, so as to release the pressure of the cams e on the cover T, which retains the filtering material in the filter, and allow the cover to have a few inches loose play, as shown in dotted lines in Fig. 6. The filter is then placed upon the cradle M, Figs. 2 and 8, where it is rocked or shaken while subjected to a strong stream of water. The loosening and play of the cover of the filtering material permit that material to be agitated by the movement of the filter with the cradle M. The finned sleeve s of each of the stay-bolts X, Figs. 3 and 4, breaks up any coherence of the filtering material, and thus and by the attrition of its particles one against the other the filtering material is thoroughly scoured, so that its impurities may be and are washed away. A few minutes' treatment of this kind is sufficient, when the water is shut off and the cleaned filter is run back into the filter-house ready for use when required.

The filter-holding grooves g in the sides of the basins may be inclined if preferred, and the term "vertical" as herein used is intended to include any position substantially vertical.

Having thus described my invention, what I claim as new, and desire to patent, is—

1. A filter plant comprising an intake and a reservoir for filtered water separated by a filtering-basin, similar to a canal-lock, having inlet and outlet gates at its respective ends, and filters arranged in series within such basin.

2. A filter plant comprising an intake and a reservoir for filtered water separated by a filtering-basin, similar to a canal-lock, having inlet and outlet gates, filters in the form of porous walls arranged at intervals and at right angles to its length within such basin, and means for draining said basin.

3. A filter plant comprising an intake and a reservoir for filtered water separated by a filtering-basin, similar to a canal-lock, having inlet and outlet gates, and vertically-removable filters in the form of porous walls arranged in series within such basin.

4. A filter plant comprising an intake and a reservoir for filtered water separated by a filtering-basin, similar to a canal-lock, having inlet and outlet gates, filters held by their lateral edges in vertical grooves within such basin, and overhead devices for raising and lowering and conveying such filters.

5. A filter plant comprising an intake and a reservoir for filtered water separated by a filtering-basin, similar to a canal-lock, having inlet and outlet gates, and thin granular-bed filters, each of a single stratum, arranged in series within such basin, and removable therefrom.

6. A filter plant comprising an intake and a reservoir for filtered water separated by a filtering-basin, thin granular-bed filters within said basin provided with means for tightening and loosening the inclosed filtering material, overhead devices for raising and lowering and conveying such filters, and a washing-cradle upon which the filters may be placed by said overhead devices.

7. A filter plant comprising an intake and a reservoir for filtered water separated by a filtering-basin, removable granular-bed filters arranged in series within such basin and provided with means for breaking up the filtering material when the filter is rocked or shaken, and a washing-cradle adapted to receive the removed filters and to rock or shake the same.

8. A filter plant comprising an intake and a reservoir for filtered water separated by a filtering-basin, removable filters arranged in series within such basin, a sluiceway leading from said reservoir for washing the filters, and means for transferring the filters from basin to sluice.

9. A filter plant comprising an intake and a reservoir for filtered water separated by a filtering-basin, removable filters arranged in series within such basin, a sluiceway provided with a washing-cradle adapted to receive the removed filters, and means for transferring the filters from basin to cradle.

10. A filter plant comprising an intake and a reservoir for filtered water separated by a filtering-basin, removable granular-bed filters provided with means for loosening the filtering material after the filters are removed from the basin, and a sluiceway for washing the removed filters.

11. A filter plant comprising an intake and a reservoir for filtered water separated by a filtering-basin, removable granular-bed filters provided with means for loosening the filtering material after the filters are removed from the basin, and a sluiceway provided with a filter-washing cradle adapted to receive the removed filters and to rock or shake the same.

12. In a filter plant, a granular-bed filter adapted to be rocked or shaken in washing it, and comprising a pair of screen-supporting frames held together by stay-bolts provided with sleeves having fins to break up the filtering material when the filter is in motion.

13. In a filter plant, a granular-bed filter adapted to be rocked or shaken in washing it, and comprising a pair of screen-supporting frames, means for tightening or loosening the filtering material between said frames, and means for breaking up said filtering material when the filter is in motion.

14. In a filter plant, a granular-bed filter adapted to be rocked or shaken in washing it, and comprising a pair of screen-supporting frames, a single stratum of filtering material between said frames, and means for tightening and loosening said filtering material comprising a movable cover at one edge, cam-levers acting upon said cover, and means for locking said levers when the filtering material is tightened for the filtering operation, substantially as hereinbefore specified.

Signed at the city of New York, in the county of New York, and State of New York, this 7th day of March, A. D. 1900.

ROBERT T. WEAVER.

Witnesses:
   EDWARD C. DAVIDSON,
   I. L. PERRY.